Dec. 17, 1968    J. F. BLUMENFELD    3,417,186
GLASS MAKING APPARATUS

Filed July 6, 1965    2 Sheets-Sheet 1

INVENTOR.
JOHN F. BLUMENFELD
BY
McCormick, Paulding & Huber

Fig. 3
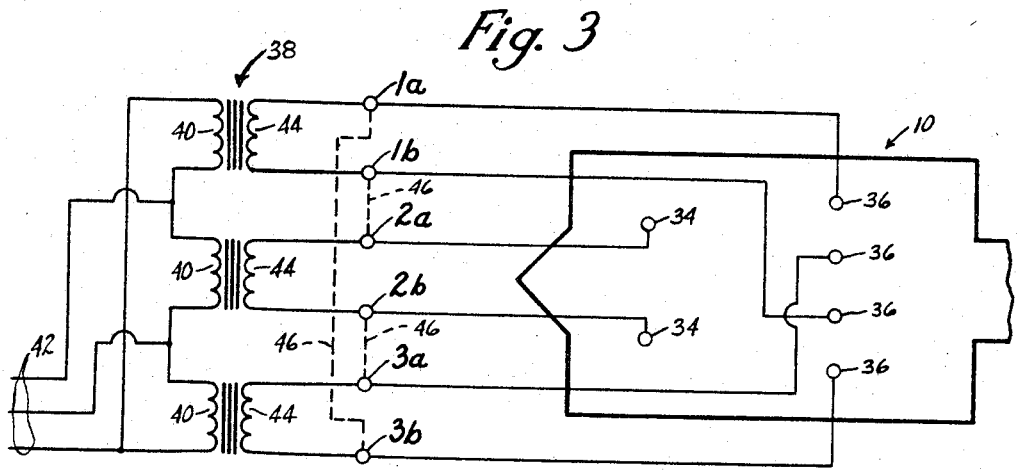
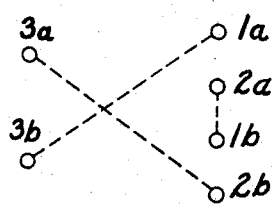
Fig. 4
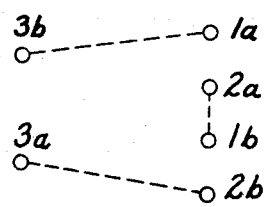
Fig. 5
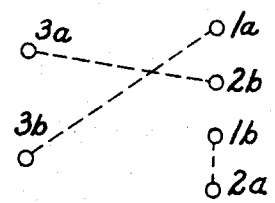
Fig. 6
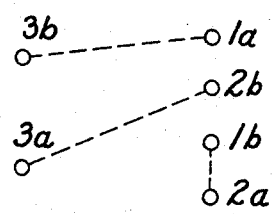
Fig. 7
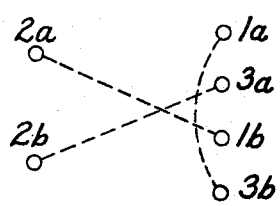
Fig. 8
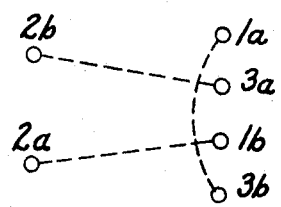
Fig. 9

United States Patent Office 3,417,186
Patented Dec. 17, 1968

3,417,186
GLASS MAKING APPARATUS
John F. Blumenfeld, Simsbury, Conn., assignor to Emhart Corporation, Bloomfield, Conn., a corporation of Connecticut
Filed July 6, 1965, Ser. No. 469,460
15 Claims. (Cl. 13—6)

ABSTRACT OF THE DISCLOSURE

In a continuous production glass making furnace a group of six electrodes are provided for heating, by Joule effect currents, the glass contained in the furnace tank. Two of the electrodes are located in the melting zone and the other four in the fining zone. A three-phase transformer providing a source of three-phase electrical power has three secondary windings each having two terminals connected to an exclusively associated pair of electrodes, the secondary windings being electrically unconnected to one another except through the molten glass. The glass may be additionally heated by other sources of heat and when this is the case the four electrodes in the fining zone are preferably located near the hot spot produced by such other heat sources.

---

This invention relates to improvements in glass making apparatus, and deals more particularly with a glass making furnace wherein the batch materials and glass are melted and fined either partially or entirely by electric currents passed through the glass between a plurality of electrodes.

This invention is particularly applicable to an electrically boosted glass making furnace wherein oil or gas fired burners or the like are used to supply part of the heat and electric or Joule effect currents passed through the glass are used to supply additional heat. Such a furnace may be one designed initially to use both combustion and electrical heat or may be one designed initially for combustion heating only and to which electric heating electrodes are later added to increase or boost its output. For this reason, the invention is illustrated and described herein as applied to an electrically boosted furnace. However, it is possible that in some instances the particular electrode arrangements and energization schemes which comprise the invention may also be used to advantage in a furnace heated solely by the electrodes of the invention or by such electrodes in conjunction with other electrodes or other electrical heating means. Therefore, the invention should not in all aspects be considered as being strictly limited to electrically boosted furnaces.

The general object of this invention is to provide a glass making furnace heated partially or entirely by electric currents passed through the glass and having an increased efficiency in the use of electrical power in comparison to previously known electrically heated furnaces of the same general type.

Another object of this invention is to provide a highly efficient physical arrangement and electrical energization of a group of electrodes placed in a glass making furnace whereby the heat released is released in general accordance with the needs of the various processes occurring in the various parts of the furnace.

A further object of this invention is to provide an improved plan for the arrangement and energization of a group of electrodes in a glass making furnace energized by a three-phase electrical power source.

A still further object of this invention is to provide a means for applying electrical energy to a glass melting furnace heated in part by combustion heat in such a way as to prevent interference with, and preferably to augment, the naturally occurring convective flow of glass in the furnace established by the combustion heating and other processes occurring in the various parts of the furnace.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 3 is a schematic diagram showing one scheme for the energization of the electrodes of the furnace of FIG. 1.

Figure 1:
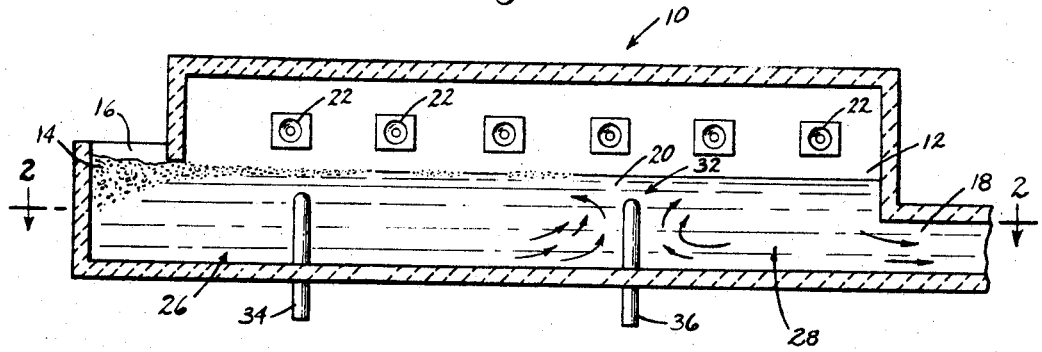
FIG. 1 is a vertical sectional view taken on the longitudinal center line of a glass making furnace embodying the present invention.

FIGS. 4–9 constitute a group of schematic diagrams showing the various possible ways in which the electrodes of the FIG. 1 furnace may be energized in accordance with this invention.

The present invention is particularly applicable to a continuous tank type of glass making furnace wherein raw batch material is charged into one end of the furnace and molten glass is removed from another end of the furnace, the glass in moving through the furnace passing through a melting zone and a fining zone, and also possibly a working zone. These particular furnace zones may or may not be separated from one another by refractory barriers or walls depending on the particular construction of the furnace. In the preferred and illustrated application of the invention, the furnace includes a tank in which the melting and fining zones are contiguous with one another and unseparated by any physical barrier and combustion heat is applied over the upper surface of the glass in both the melting and fining zones. In such a furnace, the addition of heat to the upper surface of the glass, the loss of heat through the walls of the furnace, the charging of cool batch material into one end of the furnace, the withdrawal of molten glass from the opposite end of the furnace, and other processes occurring in the tank cause the creation of a hot spot at which the temperature of the glass is the greatest. This hot spot is located somewhat toward the center of the tank, but is closer to the discharge end of the furnace than to the batch charging end so as to be located in the fining zone. As a result of the hot spot, convection currents are set up in the glass and are of such directions that rearwardly of the hot spot the surface glass tends to flow rearwardly toward the batch charging end of the furnace and forwardly of the hot spot the surface glass tends to flow forwardly toward the discharge end of the furnace. These currents are useful and beneficial to the glass making process and, among other things, tend to move the floating batch material to the batch charging end of the furnace to expose a larger surface of glass through which heat is transferred to the glass.

One of the advantages of the invention is that the heat released by the electrical currents flowing between the electrodes is added in such a manner as to augment the useful convection currents set up in the glass. Another advantage is that the electrical heat is added to the various parts of the furnace in keeping with the heat requirements of the processes carried out therein. More particularly, experience indicates that the fining process requires approximately two-thirds of the total heat supplied to a glass furnace and that the melting process requires approximately one-third of the total heat. In keeping with this, the arrangement of the invention is such that about one-third of the total added Joule effect heat is added to the melting zone and about two-thirds of the total added Joule effect heat is added to the fining zone.

Figure 2:
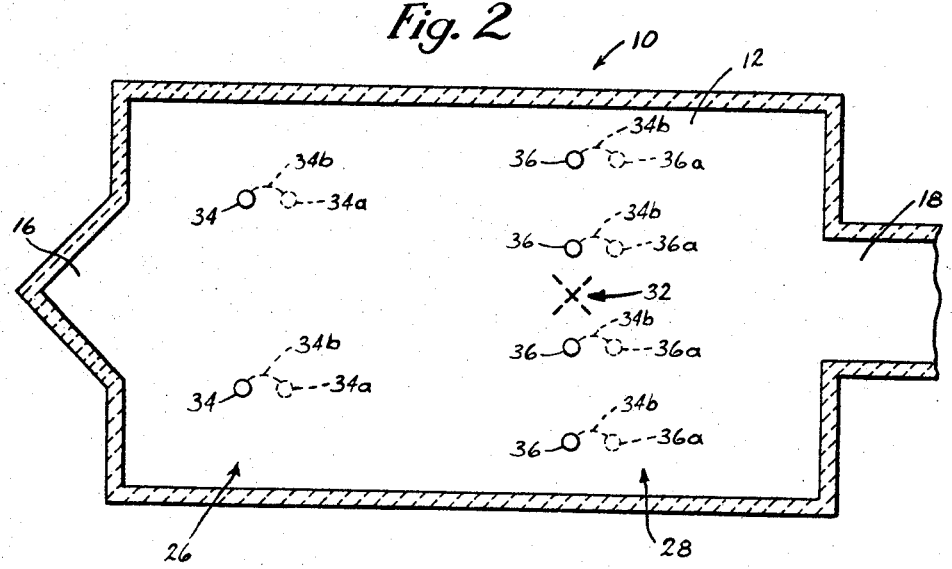
FIG. 2 is a horizontal sectional view taken on the line 2—2 of FIG. 1.

Turning now to the drawings, and first considering FIGS. 1 and 2, an exemplary furnace of the type to which this invention may be applied is indicated generally at 10 and comprises a generally rectangular tank 12. Raw batch materials 14 are fed into the tank 12 by a suitable batch charger through a charging opening or doghouse 16 located at one end of the furnace. Molten glass is removed from the opposite end of the furnace through a submerged throat 18 which leads to an associated working zone, not shown. In FIG. 1, the body of glass contained in the furnace is indicated at 20.

For heating the glass 20, the furnace 10 includes a plurality of gas or oil burners 22, 22 located in ports spaced along one side wall of the furnace as shown in FIG. 1. The exhaust gases produced by the burners 22, 22 are removed from the furnace through a number of exhaust ports, not shown, located in the opposite side wall of the furnace. In the illustrated furnace, melting of the raw batch material 14 occurs in the end portion of the tank 12 adjacent the charging opening 16 and fining of the glass occurs in the remaining portion of the tank adjacent the discharge throat 18. The portion of the tank in which melting occurs is commonly referred to as the melting zone and the portion of the tank in which the fining occurs is likewise commonly referred to as the fining zone. Actually, in a furnace having no physical barrier between the melting and fining zones the dividing line between the two zones is poorly defined. For convenience, the melting zone is, therefore, generally taken to include that portion of the glass which includes floating batch material and the fining zone is taken to include that portion of the glass which is substantially free and clear of any floating material. In FIG. 1, the melting zone is indicated generally at 26 and the fining zone is indicated generally at 28.

As the body of glass 20 is heated by the use of the burners 22, 22, convective currents are set up in the glass as a result of the applied heat and as a result of the various other processes occurring in the furnace. The directions of a part of these convection currents are indicated generally by the arrows of FIG. 1. From studying this figure, it will be noted that the glass tends to rise at one point of the fining zone. At this point, indicated generally by the broken line X at 32 in FIG. 2 and customarily referred to as the hot spot, the temperature of the glass is at a maximum value and the surface of the glass is at a maximum elevation so as to run downhill in all directions therefrom. Rearwardly of the hot spot 32, the surface glass tends to flow rearwardly toward the batch charging opening 16 and forwardly of the hot spot the surface glass tends to flow forwardly toward the discharge throat 18. From FIG. 2, it will be noted that the hot spot is located generally at the transverse middle of the tank so that from the hot spot the surface glass also has a lateral component of flow toward the side walls of the furnace.

In accordance with the invention, electrical heat is applied to the body of glass 20 in the tank 12 by means of two sets of electrodes spaced longitudinally of the furnace and preferably located respectively in the melting zone 26 and the fining zone 28. As shown best in FIG. 2, one set of electrodes is comprised of two electrodes 34, 34 and the other set of electrodes is comprised of four electrodes 36, 36. These two sets of electrodes are spaced a substantial distance longitudinally of the tank from one another and may be located at various different points along the length of the furnace without departing from the broader aspects of the invention. Preferably and as shown, however, the two electrodes 34, 34 are located in the melting zone and the four electrodes 36, 36 are located in the fining zone. In the illustrated case, the electrodes 34, 34 are located in a plane passing transversely of the furnace, are arranged vertically and extend into the glass 20 through the bottom wall of the furnace. This arrangement is not, however, essential to the broader aspects of the invention and the electrodes 34, 34 may, if desired, be otherwise inserted into the glass as by passing horizontally through the side walls of the furnace, by being located in alcoves in the side of the furnace, or by passing vertically into the body of glass from holders located above the surface of the glass.

As shown in FIG. 2, the four electrodes 36, 36 are located in a second plane or row extending transversely of the furnace. These electrodes are transversely spaced from one another and from the side walls of the furnace and extend vertically into the body of glass 20 through the bottom wall of the furnace. This particular arrangement is not, however, entirely essential to the broader aspects of the invention and, if desired, the two end electrodes 36, 36 may be inserted horizontally through the side walls of the furnace or located in alcoves in the side walls of the furnace, or all or some of the electrodes 36, 36 may be inserted vertically into the glass body from holders located above the surface of the glass. In any event, the two end electrodes 36, 36 are preferably located close to the adjacent side walls of the furnace so that the heat released by the four electrodes 36, 36 is released in a zone extending the full width of the furnace thereby assuring that all of the glass passing the electrodes is properly heated.

In addition to the electrodes 34, 34 and 36, 36, the furnace 10 may be provided with a plurality of additional electrodes so as to provide each electrode 34 or 36 with one or more closely adjacent electrodes electrically connected thereto. Such optional additional electrodes are shown in broken lines in FIG. 2 at 34a and 36a and the electrical connections between these additional electrodes and the electrodes 34, 34 and 36, 36 are indicated by the broken lines 34b and 36b. It should, therefore, be understood that as used herein the term "electrode" is meant to include both a single electrode and also two or more closely spaced electrically connected electrodes which in effect act as a single electrode. Also, by "electrically connected" it is meant that the two or more closely spaced electrodes are connected by electrical conductors other than the glass body into which they are inserted.

In further accordance with this invention, the electrodes 34, 34 and 36, 36 are energized by a three-phase electrical power source and are connected with such power source in such a manner that one phase of the power source is connected across the two electrodes 34, 34, a second phase is connected across two of the four electrodes 36, 36 and the remaining or third phase is connected across the two remaining electrodes 36, 36. When the four electrodes 36, 36 are arranged in a row, as in FIG. 3, the electrical connection is further such that the two electrodes 36, 36 connected to the second phase have located therebetween one electrode 36 connected to the third phase. Various electrical connection schemes may be employed to provide this type of electrical interconnection between the electrodes and the three-phase source. One such connection scheme is shown in FIG. 3. Referring to this figure, the three-phase source of electrical power is shown to comprise a transformer, indicated generally at 38, including three primary windings 40, 40 which are connected in delta fashion to a three-phase power line 42. Inductively connected with the primary windings 40, 40 are three secondary windings 44, 44 each of which provides one of the three electrical phases for energizing the furnace electrodes. As shown in FIG. 3, the first phase or secondary winding 44 includes two output terminals 1a and 1b, the second phase or secondary winding 44 includes two output terminals 2a and 2b and the third phase or secondary winding includes two output terminals 3a and 3b. The first phase is connected to two of the electrodes 36, 36 by suitable lines connected to the output terminals 1a and 1b. The second phase is connected to the two electrodes 34, 34 by two other lines connected to the output terminals 2a and 2b and the two remaining electrodes 36, 36 in the fining zone are connected to the third phase by lines connected to the output terminals 3a and 3b.

From studying FIG. 3, it will be noted that the output terminals 1b and 2a are associated with the same terminal on the primary side of the transformer and therefore are of a common polarity insofar as their electrical potentials will rise and fall in common with each other. Likewise, the terminals 2b and 3a are of a common polarity with each other and the terminals 3b and 1a are of a common polarity with each other. If desired, each pair of common polarity terminals may be electrically connected to each other by a conductor such as indicated by the broken lines in FIG. 3 at 46. Preferably, however, the conductors 46, 46 are omitted and the various output terminals of the electrical source are unconnected with one another except through the molten glass 20 in the furnace. This permits the output voltages of the secondary windings to be adjusted independently of one another, if desired, without setting up circulating currents in the windings. When the terminals are electrically unconnected with each other except through the glass, the two output terminals of a common polarity pair do not necessarily remain at exactly the same electrical potential. However, the potential difference between two common polarity terminals will tend to be small and little heating current will flow therebetween.

Six different basic electrical connection schemes may be used to achieve the electrical interconnection of the electrodes and source as described above. These six basic schemes are shown in FIGS. 4–9, and all other arrangements can be shown to be mere duplications or reversals of those shown. In FIGS. 4–9, the six small circles shown in each scheme represent the six electrodes of the furnace and the reference characters 1a, 1b, etc. alongside of each electrode indicate the output terminal to which each electrode is connected. Also in the schemes of FIGS. 4–9, the broken lines extend between and indicate the pairs of electrodes that are of a common polarity with one another. That is, in each scheme the terminals 1b and 2a are of a common polarity with each other, the terminals 2b and 3a are of a common polarity with each other and the terminals 3b and 1a are of a common polarity with each other. Accordingly, two of the four electrodes 36, 36 are of a common polarity with one another and the other two of the four electrodes 36, 36 are of a common polarity with a respective one of the two electrodes 34, 34.

In studying all of the six schemes of FIGS. 4–9, it will be noted that the group of four electrodes in the fining zone may be so electrically connected with the two associated phases of the three-phase source that the two common polarity electrodes included in the group are the two middle electrodes (as in the schemes of FIG. 4 and FIG. 5), are the two end electrodes (as in the schemes of FIG. 8 and FIG. 9), or are two electrodes located to one side of the center of the group (as in the schemes of FIG. 6 and FIG. 7). The schemes of FIG. 4, FIG. 5, FIG. 8, and FIG. 9 are symmetrical with respect to a longitudinal plane passing through the furnace and, therefore, are generally preferred over the schemes of FIG. 6 and FIG. 7. As to the electrodes 34, 34 in the melting zone, these electrodes may be electrically connected relative to the four electrodes 36, 36 in such a manner that each electrode 34 has its associated common polarity electrode 36 located either on the same side of or on the opposite side of a longitudinal plane passing between the two electrodes 34, 34. In the schemes of FIG. 4, FIG. 6, and FIG. 8, each electrode 34 has its corresponding common polarity electrode 36 located on the opposite side of a longitudinal plane passing between the two non-common polarity electrodes 36, 36. In the schemes of FIG. 5, FIG. 7, and FIG. 9, each electrode 34 has its common polarity electrode located on the same side of such a longitudinal plane.

A simulated laboratory test was made of the six schemes of FIGS. 4–9 by using a sheet of electrically conductive paper cut to conform generally to the shape of a furnace such as shown in FIG. 2, and containing contacts arranged generally similar to the arrangement of the electrodes 34, 34 and 36, 36 of FIG. 2. These contacts in turn were successively connected to a three-phase source of electrical power in accordance with the six schemes and measurements were made of the applied voltages and the currents passing through the various contacts. Although the electrically conductive paper was two-dimensional, as opposed to the three-dimensional configuration of the glass tank, the currents flowing in the paper were generally analogous to those which would flow in the glass. The results of these tests showed that the schemes of FIG. 4 and FIG. 8 produce the closest balancing of power among the three phases and therefore most closely achieve the result of delivering one-third of the electrical heat to the melting zone and two-thirds of the electrical heat to the fining zone. Of these two schemes, the scheme of FIG. 8 is the preferred scheme in that it has the advantage of releasing more heat in the transverse middle of the furnace and therefore closer to the hot spot. In the scheme of FIG. 4 the two middle electrodes 36, 36 are of common polarity with one another and therefore less heat is released in the transverse center of the tank than is released in the same spot by the scheme of FIG. 8 wherein the two end electrodes are of a common polarity with one another.

It is a common practice in the glass industry to rate the production capacity of an oil or gas-fired furnace in terms of its output per unit area of glass in contact with the burning fuel. In the manufacture of glass for use in glass containers, a capacity in the range of twenty to twenty-five tons per day per 100 square feet of surface area is commonly accepted as a reasonable performance objective, and the higher figure is seldom achieved except in the largest and most efficient of such furnaces. As an example of the use of this invention, it may be noted that an electric boosting system in accordance with this invention has been applied to a gas-fired furnace which had previously been used to produce glass at a maximum rate of twenty-five tons per day per 100 square feet. After adding the electrical boosting system, the gas consumption rate was reduced thereby lowering the temperature of the crown of the furnace. Sufficient electrical energy was then applied to increase the output rate of the furnace from 20.5 to 29.1 tons per day per 100 square feet with an identical glass quality and at an energy expenditure of 823 kilowatt hours per ton of increased output.

The invention claimed is:

1. In a continuous production glass making furnace, the combination comprising: a tank for containing a body of molten glass and raw materials and including a charging end to which raw materials are added and a discharge end from which molten glass is removed, said tank further including a first zone between said charging end and a point intermediate said charging and discharge ends and a second zone between intermediate point and said discharge end, two electrodes in said first zone and four electrodes in said second zone, means providing a three-phase source of electrical power, means electrically connecting one phase of said three-phase source across said two electrodes in said first zone, means electrically connecting a second phase of said three-phase source across two of said electrodes in said second zone, and means electrically connecting the third phase of said three-phase source across the remaining two of said electrodes in said second zone.

2. The combination defined in claim 1 further characterized by said three-phase source including three secondary transformer windings each providing a respective one of said three phases and each including two output terminals, the two output terminals of each phase being electrically unconnected to any of the output terminals of the other two phases except through the glass in said furnace.

3. The combination defined in claim 1 further characterized by said four electrodes in said second zone being arranged in a row extending transversely of said tank.

4. The combination defined in claim 3 further characterized by additional means for heating the glass in said tank which additional heating means when operating without the aid of heat produced by said electrodes causes the production of a hot spot in the glass in said tank which hot spot is located in said second zone, said row of four electrodes in said second zone being located in the vicinity of said hot spot.

5. The combination defined in claim 3 further characterized by said four electrodes in said second zone being connected to the two associated phases of said three-phase source in such a manner that the two electrodes across which one of said latter phases is connected have located therebetween one of the two electrodes across which the other of said latter phases is connected.

6. In a continuous production glass making furnace, the combination comprising: a tank for containing a body of molten glass and raw materials and including a charging end to which raw materials are added and a discharge end from which glass is removed, said tank having a bottom surface extending in substantially straight line fashion from said charging end to said discharge end, two electrodes extending into said tank and located in spaced relation to each other along a first line extending generally transversely of said tank, four other electrodes extending into said tank and located in spaced relation to each other along a second line extending generally transversely of said tank, said second line being spaced longitudinally of said tank from said first line and being located between said first line and said discharge end of said tank, means providing a three-phase source of electrical power, means electrically connecting one phase of said three-phase source across said two electrodes of said first line, means electrically connecting a second phase of said three-phase source across two of said electrodes of said second line, and means electrically connecting the third phase of said three-phase source across the remaining two of said electrodes of said second line, said four electrodes of said second line being spaced from one another transversely of said tank and being connected to the two associated phases of said three-phase source in such a manner that the two electrodes across which one of said latter phases is connected have located therebetween one of the two electrodes across which the other of said latter phases is connected.

7. The combination defined in claim 6 further characterized by said four electrodes of said second line including two electrodes which are electrically common with each other and two other electrodes each of which is electrically common with a respective one of said two electrodes of said first line and, said two electrodes of said second line which are electrically common with each other being the middle two electrodes of the four electrodes of said second line.

8. The combination defined in claim 7 further characterized by two of the electrodes of said second line and one of the electrodes of said first line being located to one side of a plane passing longitudinally of said tank, the other two of the electrodes of said second line and the other one of the electrodes of said first line being located to the other side of said longitudinal plane, and each of the two electrodes of said first line having its associated electrically common electrode located on the opposite side from it of said longitudinal plane.

9. The combination defined in claim 6 further characterized by additional means for heating the glass in said tank which additional heating means when operating without the aid of heat produced by said electrodes causes the production of a hot spot in the glass contained in said tank, said four electrodes of said second line being so located longitudinally of said tank that said second line passes substantially through said hot spot.

10. The combination defined in claim 6 further characterized by said four electrodes of said second line including two electrodes which are electrically common with each other and two other electrodes each of which is electrically common with a respective one of said two electrodes of said first line, and said two electrodes of said second line which are electrically common with each other being the two end electrodes of the four electrodes of said second line.

11. The combination defined in claim 10 further characterized by two of the electrodes of said second line and one of the electrodes of said first line being located to one side of a plane passing longitudinally of said tank, the other two of the electrodes of said second line and the other one of the electrodes of said first line being located to the other side of said longitudinal plane, and each of the two electrodes of said first line having its associated electrically common electrode located on the opposite side from it of said longitudinal plane.

12. In a glass making furnace the combination comprising a tank for containing a body of molten glass, said tank having a batch charging opening at one end thereof and having a glass discharge opening at the opposite end thereof, means for combustion heating the upper surface of said glass to produce a hot spot region in said glass located between said batch charging and discharge ends of said tank, four spaced electrodes arranged in a row extending transversely of said tank and located at approximately the same point along the length of said tank as said hot spot region, two other electrodes spaced transversely of said tank at a point intermediate said hot spot region and said batch charging end of said tank, means providing a three-phase source of electrical power, means electrically connecting one phase of said three-phase source across said two other electrodes, means connecting a second phase of said three-phase source across two of said four electrodes at said hot spot region, and means connecting the third phase of said three-phase source across the remaining two of said four electrodes of said hot spot region.

13. In a glass making furnace the combination comprising: a tank for containing a body of molten glass and raw materials and including a charging end to which raw materials are added and a discharge end from which molten glass is removed, said tank further including a first zone between said charging end and a point intermediate said charging and discharge ends and a second zone between said intermediate point and said discharge end, six electrodes arranged with two of said electrodes located in said first zone and with four of said electrodes in said second zone, means providing a three-phase source of electrical power, and means connecting each phase of said three-phase source to a respective pair of said six electrodes, said four electrodes in said second zone being arranged closer to one another than to said two electrodes in said first zone.

14. In a glass making furnace the combination comprising: a tank for containing a body of molten glass and raw materials and including a charging end to which raw materials are added and a discharge end from which molten glass is removed, said tank further including a first zone between said charging end and a point intermediate said charging and discharge ends and a second zone between said intermediate point and said discharge end, six electrodes arranged with two electrodes located in said first zone and with four electrodes located in said second zone, means additional to said electrodes for heating the glass in said tank which additional heating means when operating without the aid of heat produced by said electrodes causes the production of a hot spot in the glass in said tank which hot spot is located in said second zone, said four electrodes in said second zone being located in the vicinity of said hot spot, means providing a three-phase source of electrical power, and means connecting each phase of said three-phase source to a respective pair of said six electrodes.

15. The combination defined in claim 14 further characterized by said three-phase source including three secondary transformer windings each providing a respective one of said three phases and each including two output terminals, the two output terminals of each phase being electrically unconnected to any of the output terminals of the other two phases except through the glass in said furnace.

References Cited

UNITED STATES PATENTS

| | | | |
|---|---|---|---|
| 2,767,235 | 10/1956 | Herrold et al. | 13—6 |
| 2,975,224 | 3/1961 | Burch | 13—6 X |
| 3,182,112 | 5/1965 | Torok | 13—6 |

BERNARD A. GILHEANY, *Primary Examiner.*

H. B. GILSON, *Assistant Examiner.*

U.S. Cl. X.R.

13—12